US011591508B2

(12) United States Patent
Davis et al.

(10) Patent No.: US 11,591,508 B2
(45) Date of Patent: Feb. 28, 2023

(54) OIL-BASED DRILL-IN FLUID WITH ENHANCED FLUID LOSS PROPERTIES

(71) Applicant: Halliburton Energy Services, Inc., Houston, TX (US)

(72) Inventors: Chesnee Lae Davis, Spring, TX (US); Jeffrey J. Miller, Spring, TX (US); William Walter Shumway, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 90 days.

(21) Appl. No.: 16/605,789

(22) PCT Filed: Nov. 19, 2018

(86) PCT No.: PCT/US2018/061829
§ 371 (c)(1),
(2) Date: Oct. 16, 2019

(87) PCT Pub. No.: WO2020/106273
PCT Pub. Date: May 28, 2020

(65) Prior Publication Data
US 2021/0079285 A1    Mar. 18, 2021

(51) Int. Cl.
*C09K 8/36* (2006.01)
*C09K 8/565* (2006.01)

(52) U.S. Cl.
CPC ............... *C09K 8/36* (2013.01); *C09K 8/565* (2013.01)

(58) Field of Classification Search
CPC .......... C09K 8/03; C09K 8/032; C09K 8/035; C09K 8/04; C09K 8/26; C09K 8/265; C09K 8/28; C09K 8/32; C09K 8/34; C09K 8/36; C09K 8/56; C09K 8/565
See application file for complete search history.

(56) References Cited

U.S. PATENT DOCUMENTS

| | | | | |
|---|---|---|---|---|
| 5,942,468 A | * | 8/1999 | Dobson, Jr. | C09K 8/36 507/136 |
| 5,990,050 A | * | 11/1999 | Patel | G01V 3/20 507/136 |
| 6,248,698 B1 | | 6/2001 | Mullen et al. | |
| 6,828,279 B2 | * | 12/2004 | Patel | C09K 8/36 507/136 |
| 7,747,768 B1 | | 6/2010 | Givoly | |

(Continued)

OTHER PUBLICATIONS

ISRWO International Search Report and Written Opinion for PCT/US2018/061829 dated Aug. 16, 2019.
(Continued)

*Primary Examiner* — Angela M DiTrani Leff
(74) *Attorney, Agent, or Firm* — Thomas Rooney; C. Tumey Law Group PLLC

(57) ABSTRACT

Treatment fluids and methods of using a treatment fluid for minimizing fluid loss in a wellbore are disclosed. A method may comprise providing a drill-in fluid. The drill-in fluid may comprise an aqueous liquid, a base oil, a polyol, an emulsifying surfactant, and a solid bridging agent. The method may further comprise circulating the drill-in fluid through a drill-string and past a drill bit. The method may further comprise drilling in a reservoir section of a subterranean formation to extend a wellbore in the reservoir section the drill-in fluid is circulated therein.

19 Claims, 1 Drawing Sheet

(56) References Cited

U.S. PATENT DOCUMENTS

| | | | | |
|---|---|---|---|---|
| 7,939,470 B1* | 5/2011 | Wagle | ............... | C09K 8/36 507/129 |
| 8,936,086 B2 | 1/2015 | Liang et al. | | |
| 2004/0014609 A1* | 1/2004 | Dalmazzone | ............ | C09K 8/36 507/200 |
| 2010/0248996 A1* | 9/2010 | Sawdon | ............... | C09K 8/502 507/117 |
| 2010/0319915 A1* | 12/2010 | Bustos | ............... | C09K 8/516 166/278 |
| 2011/0168395 A1 | 7/2011 | Welton et al. | | |
| 2011/0214874 A1 | 9/2011 | Dakin et al. | | |
| 2012/0165231 A1* | 6/2012 | Miller | ............... | C09K 8/05 507/143 |
| 2012/0181019 A1* | 7/2012 | Saini | ............... | B82Y 30/00 166/250.01 |
| 2013/0020083 A1* | 1/2013 | Wagle | ............... | C09K 8/12 166/285 |
| 2014/0190695 A1 | 7/2014 | Van Zanten et al. | | |
| 2016/0160113 A1 | 6/2016 | Nguyen et al. | | |
| 2016/0369151 A1 | 12/2016 | Livanec et al. | | |
| 2017/0073566 A1* | 3/2017 | Pober | ............... | E21B 21/00 |
| 2017/0199296 A1 | 7/2017 | Panamarathupalayam et al. | | |
| 2018/0340382 A1 | 11/2018 | Davis et al. | | |

OTHER PUBLICATIONS

Al Moajil, A. M., Nasr-El-Din, H. A., Kar, Y., Al-Bagoury, M., & Steele, C. D. (2015). Dispersants for Cement and Salt Contaminated Manganese Tetraoxide High-Density Water-Based Drilling Fluids. Abu Dhabi International Petroleum Exhibition and Conference.

Al Moajil, A. M., Rabie, A. I., Nasr-El-Din, H. A., Al-Bagoury, M., & Steele, C. D. (2016). Effective Dispersants for Mn3O4 Water-Based Drilling Fluids: Influence of Clay and Salt. Offshore Technology Conference Asia.

* cited by examiner

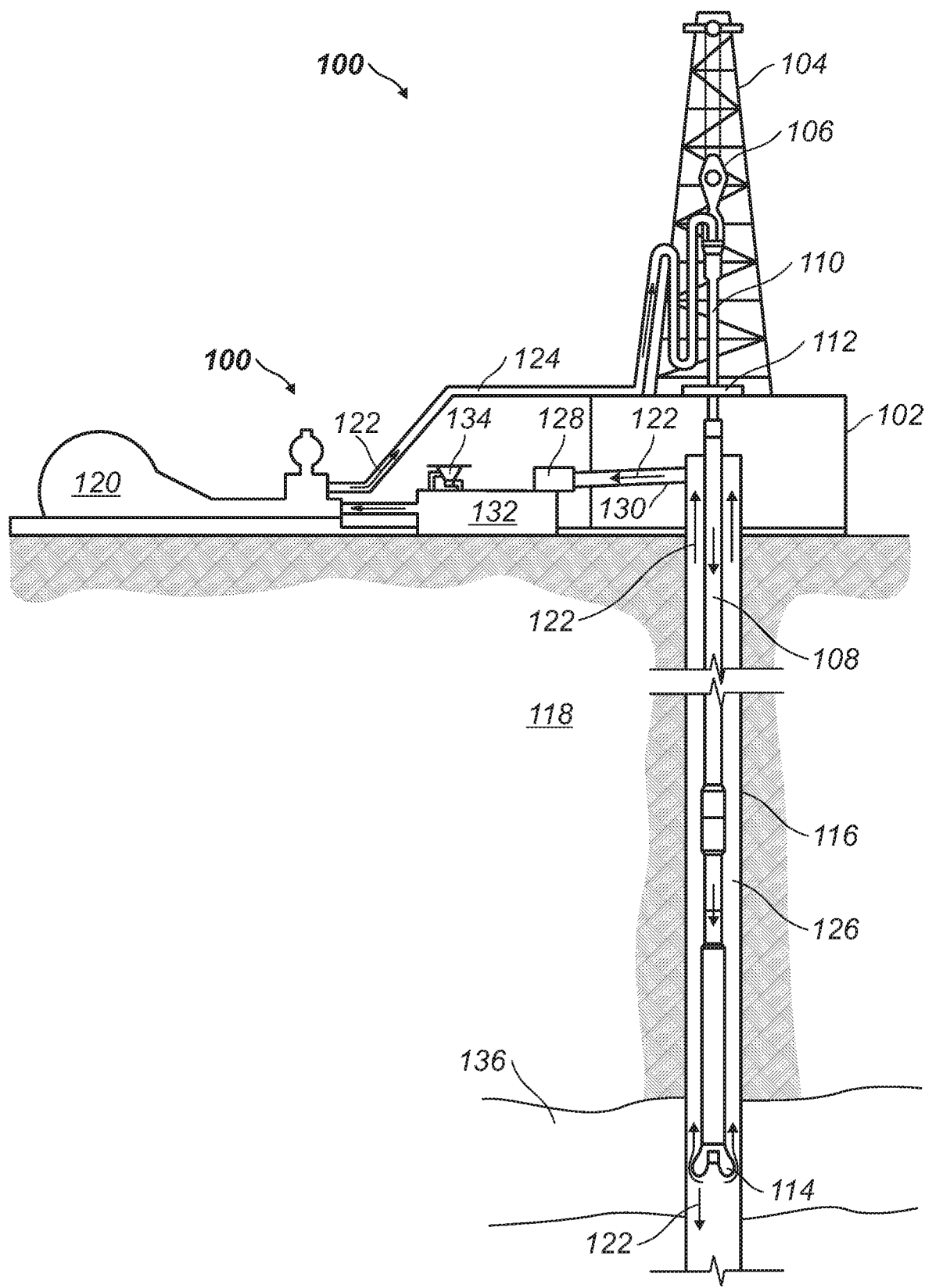

OIL-BASED DRILL-IN FLUID WITH ENHANCED FLUID LOSS PROPERTIES

BACKGROUND

Many oil and gas wells in unconsolidated or poorly consolidated sandstone formations are completed "open hole," meaning that the well bores do not contain casing or liners. Although this type of completion allows the produced fluids to flow directly into the well bore, it suffers the disadvantage that the sandface is unsupported and may collapse. Also, selective treatments or remedial operations within the reservoir section may be more difficult.

Unconsolidated or poorly consolidated formations generally are high permeability production intervals and are drilled with specialized fluids referred to in the art as "drill-in fluids." In addition to these high permeability production intervals, drill-in fluids also may be used when drilling through other reservoir sections of a wellbore, for example, to minimize damage while maximizing production. A drill-in fluid generally may include particulate solids (e.g., for bridging on the pore throats of the sandstone of the formation); and polymeric components (e.g., for providing viscosity and fluid loss control). Under pressurized downhole conditions, the drill-in fluid may form a filter cake that includes an acid-soluble portion (e.g., calcium carbonate bridging solids) and a polymeric portion on the face of a portion of the subterranean formation. In most instances, once formed, the integrity of the filter cake should be maintained to provide the necessary fluid loss control and hole stability for subsequent operations.

Fluid loss when drilling through reservoir sections, such as high permeability sandstone can be problematic for drill-in fluids. Fluid loss is undesirable as it results in more fluid needing to be pumped, which increases expense. Moreover, the fluid that leaks off into the formation can cause damage to the formation, which may decrease permeability and/or productivity.

BRIEF DESCRIPTION OF THE DRAWINGS

For a detailed description of the preferred embodiments of the invention, reference will now be made to the accompanying drawings in which:

The FIGURE illustrates a drilling assembly.

DETAILED DESCRIPTION

The present disclosure may be directed to treatment fluids and methods of using a treatment fluid for minimizing fluid loss in a wellbore. More particularly, the present disclosure may relate to fluid loss control for drill-in fluids, and, in some embodiments, to oil-based drill-fluids that use a polyol to reduce fluid loss and to methods of using such fluids in subterranean drilling operations. Advantageously, the polyol may reduce of the oil-based fluid into the reservoir section, thus enabling use of a drill-in fluid that is oil-based were a brine-based fluid is currently used.

In contrast to drilling fluids, "drill-in" fluids are specialized fluids designed for drilling through reservoir section or unconsolidated formations. The drill-in fluids are designed to minimize fluid loss while being formation compatible to minimize damage. Among other things, the drill-in fluids may have an optimized particle size mix to improve bridging, thus minimizing fluid loss. Weighting agents used in the drill-in fluid may also be acid-soluble to allow for cleanup and removal of fluid and filter-cake residue. Drill-in fluids also have enhanced filtration control to prevent (or reduce) filtrate invasion into the reservoir.

The drill-in fluid may include a base oil as an external phase, an aqueous internal phase, a solid bridging agent, an emulsifying surfactant, a weighting agent, and a polyol. Suitable drill-in fluids may have a density of about 7 pounds per gallon ("lb/gal") (840 kg/m$^3$) or greater. Alternatively, suitable drill-in fluids may have a density at a point in range of from about 7 pounds per gallon ("lb/gal") (840 kg/m$^3$) to about 20 lb/gal (2400 kg/m$^3$). Optionally, suitable drill-in fluids may have a density at a point in range of from about 8 lb/gal (960 kg/m$^3$) to about 12 lb/gal (1440 kg/m$^3$). Suitable drill-in fluids may be in the form of an invert emulsion including an internal aqueous phase and an external oil phase. The invert emulsion may have any suitable internal aqueous phase to external oil phase ratio, including but not limited to, about 40:80 to about 99:1 or about 50:50 to about 99:1.

In accordance with present embodiments, the drill-in fluid may include any suitable internal aqueous phase, which may include an aqueous liquid. The aqueous liquid may be from any source provided that it does not contain an excess of compounds that may undesirably affect other components in the dri fluids. Suitable aqueous liquids may include but are not limited to, fresh water or salt water. Salt water generally may include one or more dissolved salts therein and may be saturated or unsaturated as desired for a particular application. Seawater or brines may be suitable for use in some examples. Further, the aqueous liquid may be present in the drill-in fluid in any suitable amount. Without limitation, aqueous liquid may be present in the drill-in fluid in an amount of about 1 wt. % to about 70 wt. % based on a total weight of drill-in fluid, about 1 wt. % to about 5 wt. % based on a total weight of drill-in fluid, about 5 wt. % to about 10 wt. % based on a total weight of drill-in fluid, about 10 wt. % to about 15 wt. % based on a total weight of drill-in fluid, about 15 wt. % to about 20 wt. % based on a total weight of drill-in fluid, about 20 wt. % to about 25 wt. % based on a total weight of drill-in fluid, about 25 wt. % to about 30 wt. % based on a total weight of drill-in fluid, about 3 wt. % to about 35 wt. % based on a total weight of drill-in fluid, about 35 wt. % to about 40 wt. % based on a total weight of drill-in fluid, about 40 wt. % to about 45 wt. % based on a total weight of drill-in fluid, about 45 wt. % to about 50 wt. % based on a total weight of drill-in fluid, or about 10 wt. % to about 30 wt. % based on a total weight of drill-in fluid.

As previously described, one or more dissolved salts may also be present in the aqueous liquid. Where used, the dissolved salt may be included in the aqueous liquid for any purpose, including, but not limited to, densifying a drill-in fluid including water to a chosen density. A mixture of one or more dissolved salts and water may be used in some instances. The amount of salt that should be added may be the amount needed to provide a desired density. One or more salts may be added to the water to provide a brine that includes the dissolved salt and the water. Suitable dissolved salts may include monovalent (group I) and divalent salts (group II). Mixtures of monovalent, divalent, and trivalent salts may also be used. Suitable salts may include, but are not limited to, sodium chloride, sodium bromide, potassium bromide, potassium chloride, potassium formate, cesium formate, lithium chloride, lithium bromide sodium formate, lithium formate, ammonium chloride, organic cation salts such as tetramethyl ammonium chloride, choline chloride, and mixtures thereof among others. The salt may be provided in any amount or concentration such as unsaturated, saturated, supersaturated, and saturated with additional solids. For example, the salt may be provided in an amount in a range of about 1 wt. % to about 50 wt. % based on a total weight of drill-in fluid. Alternatively, the salt may be present about 1 wt. % to about 5 wt. % based on a total weight of drill-in fluid, about 5 wt. % to about 10 wt. % based on a total weight of drill-in fluid, about 10 wt. % to about 15 wt. % based on a total weight of drill-in fluid, about 15 wt. % to about 20 wt. % based on a total weight of drill-in fluid, about 20 wt. % to about 25 wt. % based on a total weight of drill-in fluid, about 25 wt. % to about 30 wt. % based on a total weight of drill-in fluid, about 30 wt. % to about 35 wt. % based on a total weight of drill-in fluid, about 35 wt. % to about 40 wt. % based on a total weight of drill-in fluid, about 40 wt. % to about 45 wt. % based on a total weight of drill-in fluid, about 45 wt. % to about 50 wt. % based on a total weight of drill-in fluid, or about 10 wt. % to about 30 wt. % based on a total weight of drill-in fluid. One of ordinary skill in the art with the benefit of this disclosure will recognize the appropriate amount of salt and aqueous liquid for a chosen application.

In accordance with present embodiments, the drill-in fluids may include any suitable external phase, which may include a base oil. Any suitable base oil may be used. In an embodiment, suitable base oils may include, but are not limited to, light mineral oil, diesel oil, a glycol ether solvent, a hydrotreated light petroleum distillate having about 9 to 16 carbon atoms, ethylene glycol monobutyl ether, diethylene glycol monobutyl ether, an alkane, an aromatic organic compound, a cyclic alkane, a paraffin, desulfurized hydrogenated kerosene, a polyolefin, a polydiorganosiloxane, a siloxane, an ester, the like, and/or any combination thereof. In an embodiment, the base oil may be diesel oil. Base oil may be present in the drill-in fluid in any suitable amount, including but not limited to, 1 wt. % to about 99 wt. % based on a total weight of drill-in fluid, or about 1 wt. % to about 5 wt. % based on a total weight of drill-in fluid, about 5 wt. % to about 10 wt. % based on a total weight of drill-in fluid, about 10 wt. % to about 15 wt. % based on a total weight of drill-in fluid, about 15 wt. % to about 20 wt. % based on a total weight of drill-in fluid, about 20 wt. to about 25 wt. % based on a total weight of drill-in fluid, about 25 wt. % to about 30 wt. % based on a total weight of drill-in fluid, about 30 wt. % to about 35 wt. % based on a total weight of drill-in fluid, about 35 wt. % to about 40 wt. % based on a total weight of drill-in fluid, about 40 wt. % to about 45 wt. % based on a total weight of drill-in fluid, 45 wt. % to about 50 wt. % based on a total weight of drill-in fluid, about 50 wt. % to about 70 wt. % based on a total weight of drill-in fluid, about 70 wt. % to about 90 wt. % based on a total weight of drill-in fluid, or about 90 wt. % to about 99 wt. % based on a total weight of drill-in fluid.

It should be noted that the term "oil," as used herein, is not limited to a viscous liquid derived from petroleum. The term "oil," as used herein, may also refer to organic oils, synthetic oils, oils derived from petroleum products, mineral oils, the like, and/or any combination thereof. One of ordinary skill in the art, along with the present disclosure would be able to select the appropriate type of oil base for a given application.

The drill-in fluid may include a polyol. As used herein, the term "polyol" refers to an organic compound with two or more hydroxyl groups. It may be advantageous to include a polyol in the drill-in fluid for a variety of reasons. For example, the inclusion of a polyol may minimize the fluid loss. Any suitable polyol capable of improving filtration control may be used. Suitable polyols may include, but are not limited to, glycol, ethylene glycol, diethylene glycol, triethylene glycol, propylene glycol, butylene glycol, polyethylene glycol, polypropylene glycol, polyethylene-polypropylene glycol, glycerol, polyglycerol, trimethylolpropane, trimethylolethane, pentaerythritol, sugar alcohols, sugar acids, and combinations thereof. Polyol may be present in the drill-in fluid in any suitable amount including, but not limited to, about 0.5 pounds per barrel (lb/bbl) lb/bbl (1.4 kg/m$^3$) to about 15 lb/bbl (43 kg/m$^3$), or about 0.75 lb/bbl (2 kg/m$^3$) to about 10 lb/bbl (29 kg/m$^3$), or about 1 lb/bbl (3 kg/m$^3$) to about 8 lb/bbl (23 kg/m$^3$).

In an embodiment, polyol may have any suitable molecular weight, including but not limited to, about 100 g/mol, 200 g/mol, or greater. In an embodiment, the glycol and/or polyol may have a molecular weight of about 100 g/mol to about 1,000 g/mol, or about 200 g/mol to about 1,000 g/mol, or about 150 g/mol to about 800 g/mol, or about 180 g/mol to about 400 g/mol.

The drill-in fluid may further include a solid bridging agent. Bridging agents typically include sized solid particulate capable of forming a bridge across the pore throat or fractures of an exposed rock thereby building a filter cake which may aid in preventing loss of whole mud or excessive filtrate may be used. Solid bridging agent may include, without limitation, particulates are soluble, particularly acid-soluble. Examples of suitable solid bridging agents may include, but are not limited to, calcium carbonate, salt particulates, iron carbonate, zinc carbonate, polylactic acid, wax particulates, magnesium carbonate, magnesium oxide, manganese tetraoxide, and combinations thereof. The solid bridging agent may include any particle size distribution as desired for a particular application. In certain embodiments, the solid bridging agent may have a mean particle size in a range of from about 1 micron to about 200 microns as defined by ASTM methods. The mean particle size corresponds to d50 values as measured by particle size analyzers such as those manufactured by Malvern Instruments, Worcestershire, United Kingdom. In specific embodiments, the sized solids may have a mean particle size in a range of from about 1 micron to about 200 microns, from about 5 microns to about 100 microns, or from about 10 microns to about 50 microns. With hydraulic shear in the drill-in fluid, as experienced when the fluid exits the jets in the drill bit under pressure, the solid bridging agent may be finely dispersed into the colloidal or sub-micron size range. The solid bridging agent may be present in any suitable amount for a particular application. For example, the solid bridging agent may be present in the drill-in fluid in an amount in a range of about 1 wt. % to about 50 wt. % based on a total weight of the drill-in fluid. Alternatively, they may be present in an amount of about 1 wt. % to about 10 wt. % by weight, about 10 wt. % to about 20 wt. % by weight, about 20 wt. % to about 30 wt. % by weight, about 30 wt. % to about 40 wt. % by weight, or about 40 wt. % to about 50 wt. % based on a total weight of the drill-in fluid.

Drill-in fluids may further include additional additives. Any suitable additional additive may be used, including but not limited to, a weighting agent, an inert solid, a fluid loss control agent, a dispersion aid, a corrosion inhibitor, an emulsion thinner, an emulsion thickener, a viscosifying agent, a gelling agent, a surfactant, a particulate, a proppant, a gravel particulate, a lost circulation material, a gas, a pH control additive, a drilling surfactant, a breaker, a biocide, a crosslinker, a chelating agent, a scale inhibitor, a gas hydrate inhibitor, a mutual solvent, an oxidizer, a reducer, a friction reducer, a clay stabilizing agent, silica scale control additive, a gel stabilizer, an anti-oxidant, a polymer degradation prevention additive, a relative permeability modifier, an iron control agent, a particulate diverter, an acid, a catalyst, a flocculant, a scavenger (e.g., $H_2S$ scavengers, $CO_2$ scavengers or $O_2$ scavengers), a bridging agent, a solubilizer, a consolidating agent, a bactericide, and combinations thereof.

In an embodiment, the drill-in fluid may further include a weighting agent. Weighting agents are typically solid particulates with a high specific gravity (e.g., greater than 2) that are capable of increasing the fluid density to thereby affect the hydrostatic pressure exerted by the drill-in fluid. In an embodiment, the weighting agent may be a dissolvable weight agent, an acid-soluble weighting agent, the like, and/or any combination thereof. Suitable weighting agents may include, but are not limited to, calcium carbonate, coated calcium carbonate (i.e., calcium carbonate coated with steric acid), manganese carbonate, manganese tetraoxide, limonite zinc carbonate, hematite, potassium chloride, sodium chloride, sodium bromide, calcium chloride, calcium bromide, ammonium chloride, zinc bromide, zinc formate, zinc oxide, barium sulfate, lead (II) sulfide, an acid soluble material, ultra-fine grind barite, micronized barite, the like, and/or any combination thereof. In some embodiments, manganese tetraoxide may be used as the weighting agent, either alone or with one or more addition weighting agents. When used with the polyol, the polyol may advantageously function as a wetting agent, thus increasing dispersability of the manganese tetraoxide. Without being limited by theory, it is believed this wetting may be due the reduction in interfacial tension that minimizes van der Waals attraction of particles, reducing aggregation of particles in the drill-in fluid. The weighting agent may be included in the drill-in fluid an amount suitable to provide a desired target density and, thus, the particular amount of the weighting agent included will vary based on a number of factors, including the particular weight agent (or agents) chosen. Suitable weights agents may be used in an amount ranging from 0.1 lb/bbl (0.3 kg/m$^3$) to about 600 lb/bbl (1710 kg/m$^3$) and, more particularly, ranging from about 10 lb/bbl (29 kg/m$^3$) to about 400 lb/bbl (1140 kg/m$^3$).

The drill-in fluid may further include an emulsifying surfactant. Any suitable emulsifying surfactant may be used. The emulsifying surfactants may include nonionic, anionic, cationic, amphoteric, and zwitterionic surfactants. Suitable emulsifying surfactants may include but are not limited to, fatty amines, ethoxylated nonylphenols, fatty acids, fatly acid esters, tall oil, oxidized tall oil, modified tall oil, rosin acid, resin acid, and combinations thereof. In an embodiment, the emulsifying surfactant may be present in the drill-in fluid in an amount of about 2 lb/bbl (6 kg/m$^3$) to about 24 lb/bbl (68 kg/m$^3$), or about 4 lb/bbl (11 kg/m$^3$) to about 20 lb/bbl (57 kg/m$^3$), or about 6 lb/bbl (17 kg/m$^3$) to about 16 lb/bbl (46 kg/m$^3$). In an embodiment, the emulsifying surfactant used may be determined based on the hydrophilic-lipophilic balance "HLB" value of the emulsifying surfactant.

The hydrophilic-lipophilic balance ("HLB") of an emulsifying surfactant is a measure of the degree to which it is hydrophilic or lipophilic, determined by calculating a value based on the chemical groups of the molecule. This method is also referred to as the Davies HLB value. The advantage of this method is that it takes into account the effect of stronger and weaker hydrophilic groups. The method works as follows: $HLB=7+m*Hh-n*Hl$ where m is the number of hydrophilic groups in the molecule, Hh is the respective group HLB value of the hydrophilic groups, n is the number of lipophilic groups in the molecule, and Hl is the respective HLB value of the lipophilic groups.

The HLB model can be used for applications including emulsification, detergency, solubilization, and other applications. Typically, a HLB value will indicate the emulsifying surfactant properties, where a value of 1 to 3 indicates anti-foaming of aqueous systems, a value of 3 to 7 indicates water in oil emulsification, a value of 7 to 9 indicates wetting, a value of 8 to 28 indicates oil in water emulsification, a value of 11 to 18 indicates solubilization, and a value of 12 to 15 indicates detergency and cleaning. In an embodiment, the emulsifying surfactant used may have an HLB value of about 8 to about 28.

The drill-in fluid may further include a filtration control agent. Any suitable filtration control agent capable of managing filtration, including bridging, bonding, deflocculation, and viscosity, may be used. The filtration control agent may also function to reduce filter cake permeability. Suitable filtration control agents may include, but are not limited to, a cellulose derivative, a latex polymer, a copolymer of acrylamido-2-methyl-2-propanesulfonic acid, polyanionic cellulose, polyacrylate, modified lignite, powdered resin, modified starch; carboxymethylcellulose, starch, starch ether derivatives, hydroxyethylcellulose, cross-linked hydroxyethylcellulose, methylestyrene-co-acrylate, a substituted styrene copolymer, any derivative thereof, the like, and/or any combination thereof. The filtration control agent may be present in the drill-in fluid in any suitable amount, including but not limited to, an amount ranging from 0.5 lb/bbl (1.4 kg/m$^3$) to about 15 lb/bbl (43 kg/m$^3$) or, more particularly, ranging from about 1 lb/bbl (3 kg/m$^3$) to about 13 lb/bbl (37 kg/m$^3$) or, more particularly, from about 2 lb/bbl (6 kg/m$^3$) to about 12 lb/bbl (34 kg/m$^3$).

The rheological and fluid loss properties of the drill-in fluid may be determined by obtaining a variety of different measurements. In an embodiment, the drill-in fluid may have a gel strength. Gel strength may be measured at any suitable time interval. In an embodiment, a 10-second gel strength may be determined. Suitable 10-second gel strengths may include, but are not limited to, about 3 lb/100 ft$^2$ (15 kg/100 m$^2$) to about 25 lb/100 ft$^2$ (122 kg/100 m$^2$) or about 5 lb/100 ft$^2$ (24 kg/100 m$^2$) to about 20 lb/100 ft$^2$ (98 kg/100 m$^2$). As used herein, the 10-second gel strength is determined by stirring a sample of the drill-in fluid for 10 seconds at 600 rpm on a FANN® 35 rheometer. The drill-in fluid sample is allowed to stand undisturbed for 10 seconds. The hand wheel is then slowly and steadily turned in the appropriate direction which may produce a positive dial reading. For instruments having a 3 rpm speed, the maximum reading attained after starting rotation at 3 rpm is the 10-s gel strength. The 10-s gel strength in pounds per 100 square feet (lb/100 sq ft) was recorded. The 10-second gel strength is considered the initial gel strength of the drill-in fluid.

In an embodiment, the 10-minute gel strength of the drill-in fluid may be determined. Suitable 10-minute gel strengths may include, but are not limited to, about 3 lb/100 ft$^2$ (15 kg/100 m$^2$) to about 50 lb/100 ft$^2$ (244 kg/100 m$^2$) or about 3 lb/100 ft$^2$ (15 kg/100 m$^2$) to about 35 lb/100 ft$^2$ (170 kg/100 m$^2$). As used herein, the 10-minute gel strength of the drill-in fluid should be determined by re-stirring the same sample used to determine the 10-second gel strength. The sample is re-stirred for an additional 10 seconds and then the drill-in fluid is undisturbed for about 10 minutes. The hand wheel is then slowly and steadily turned in the appropriate direction which may produce a positive dial reading. The maximum reading attained after starting rotation at 3 rpm is the 10-min gel strength. The 10-s gel strength in pounds per 100 square feet (lb/100 sq ft) was recorded.

It should be noted that both the 10-second gel strength and 10-minute gel strength of a drill-in fluid should be determined according to API Recommended Practice 13B-2, Recommended Practice for Field Testing of Oil-based Drilling Fluids, Fifth Edition, American Petroleum Institute, August 2014.

Optionally, the yield point of the drill-in fluid may be determined. The yield point of a drill-in fluid indicates the point on a stress-strain curve which indicates the limit of elastic behavior and the beginning of plastic behavior. Yield point as used herein is defined as the stress at which the drill-in fluid may begin to deform plastically. The drill-in fluid may have any suitable yield point, including but not limited to, about 5 lb/100 ft$^2$ (24 kg/100 m$^2$) to about 50 lb/100 ft$^2$ (244 kg/100 m$^2$), or about 5 lb/100 ft$^2$ (24 kg/100 m$^2$) to about 35 lb/100 ft$^2$ (170 kg/100 m$^2$), or any range therein.

In an embodiment, the plastic viscosity of the drill-in fluid may be determined. As used herein, "plastic viscosity" is defined as the resistance to the flow of a fluid. It may be caused by the mechanical friction within the drill-in fluid due to interaction between solids, the liquids and the deformation of liquid that is under shear stress. The drill-in fluid may have any suitable plastic viscosity, including but not limited to, about 10 cP to about 50 cP, or about 10 cP to about 20 cP, or about 20 cP to about 30 cP, or about 30 cP to about 40 cP, or about 40 cP to about 50 cP, or any range therein.

Optionally, several fluid loss properties may be determined for the drill-in fluid. Said properties may include "spurt loss," which as used herein may be understood to mean the instantaneous volume of liquid that may pass through a filter medium prior to deposition of a competent and controlling a filter cake. As used herein, the spurt loss is determined using the static filtration test according to API Recommended Practice 13B-2, Recommended Practice for Field Testing of Oil-based Drilling Fluids, Fifth Edition, American Petroleum Institute, August 2014. The spurt loss for a drill-in fluid may be any suitable spurt loss, including but not limited to, a value ranging from about 0.5 milliliter ("mL") to about 20 mL, or about 1 mL to about 15 mL, or about 1 mL to about 10 mL. The total filtrate of the drill-in fluid may also be determined.

In an embodiment, the drill-in fluid may be prepared on site at the surface of the wellbore or off site and then transported to the wellbore. The drill-in fluid may be prepared in any suitable manner. One of ordinary skill in the art, along with the present disclosure would be able to select the appropriate method for preparing the disclosed drill-in fluid for a given application.

The disclosed drill-in fluid may have particular advantages in drilling through certain sections of a subterranean formation such as a reservoir section. An advantage to using the presently disclosed drill-in fluid over the currently used drill-in fluids is that inclusion of the polyol reduces fluid loss, allowing use of an invert emulsion (i.e., oil-based fluid) instead of brine-based fluids in the reservoir section. The amount of fluid loss in a reservoir section may increase as the temperature of the wellbore increases (e.g., at or above about 121° C.). The disclosed drill-in fluid may perform at high temperatures and thereby may reduce the amount of fluid loss in the reservoir. Several methods for employing the disclosed drill-in fluid may be utilized.

A method of extending a wellbore through a reservoir section, may include circulating a drill-in fluid through a drill string and bottom hole assembly. The drill-in may enter the reservoir section and form a filter cake that may separate the reservoir from the wellbore. A mud motor to may then drive a drill bit on the end of the bottom hole assembly thereby extending the wellbore within the reservoir section.

During the drilling and completion of the wellbore, the filter cake may be gradually removed. Drilled solids may become entrained in the drill-in fluid and circulated back to the surface. The drilled solids may be cleaned to remove the entrained drill-in fluid by various means which are well known in the art and then reused.

The FIGURE illustrates a drilling assembly 100 in which a drill-in fluid 122 as disclosed above may be used. It should be noted that while THE FIGURE generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 may support the drill string 108 as it is lowered through a rotary table 112. A drill bit 114 may be attached to the distal end of the drill string 108 and may be driven either by a downhole motor and/or via rotation of the drill string 108 from the well surface. The drill bit 114 may include, but is not limited to, roller cone bits, PDC bits, natural diamond bits, any hole openers, reamers, coring bits, etc. As the drill bit 114 rotates, it may create a wellbore 116 that penetrates various subterranean formations 118. In an embodiment, the drill bit 114 may penetrate reservoir section 136.

Drill-in fluid 122 including an internal aqueous phase, which may include fresh water or a brine, an external phase, which may include a base oil, a polyol, and a weighting agent may be prepared. Additionally, drill-in fluid 122 may further include additional additives, any suitable additives may be used. A pump 120 (e.g., a mud pump) may circulate drill-in fluid 122 through a feed pipe 124 and to the kelly 110, which conveys the drill-in fluid 122 downhole through the interior of the drill string 108 and through one or more orifices in the drill bit 114 and into reservoir section 136. The drill-in fluid 122 may then be circulated back to the surface via an annulus 126 defined between the drill string 108 and the walls of the wellbore 116. At the surface, the recirculated or spent drill-in fluid 122 may exit the annulus 126 and may be conveyed to one or more fluid processing unit(s) 128 via an interconnecting flow line 130. The fluid processing unit(s) 128 may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and/or any fluid reclamation equipment. The fluid processing unit(s) 128 may further include one or more sensors, gauges, pumps, compressors, and the like used store, monitor, regulate, and/or recondition the drilling fluid.

After passing through the fluid processing unit(s) 128, a "cleaned" drill-in fluid 122 may be deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure. One or more of the drilling fluid additives may be added to the drill-in fluid 122 via a mixing hopper 134 communicably coupled to or otherwise in fluid communication with the retention pit 132. The mixing hopper 134 may include, but is not limited to, mixers and related mixing equipment known to those skilled in the art. Alternatively, the drilling fluid additives may be added to the drill-in fluid 122 at any other location in the drilling assembly 100. While THE FIGURE shows only a single retention pit 132, there could be more than one retention pit 132, such as multiple retention pits 132 in series. Moreover, the retention pit 132 may be representative of one or more fluid storage facilities and/or units where the drilling fluid additives may be stored, reconditioned, and/or regulated until added to the drill-in fluid 122. During drilling, drill-in fluid 122 may form foam. Defoamer present in the drilling fluid may break the foam in a suitable time frame. In an embodiment, the presence of the defoamer in drill-in fluid 122 may prevent the formation of foam.

The drilling fluids disclosed herein may directly or indirectly affect one or more components or pieces of equipment associated with the preparation, delivery, recapture, recycling, reuse, and/or disposal of the disclosed drilling fluids. For example, the disclosed drilling fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary drilling fluids. The disclosed drilling fluids may also directly or indirectly affect any transport or delivery equipment used to convey the drilling fluids to a well site or downhole such as, for example, any transport vessels, conduits, pipelines, trucks, tubulars, and/or pipes used to compositionally move the drilling fluids from one location to another, any pumps, compressors, or motors (e.g., topside or downhole) used to drive the drilling fluids into motion, any valves or related joints used to regulate the pressure or flow rate of the drilling fluids, and any sensors (i.e., pressure and temperature), gauges, and/or combinations thereof, and the like. The disclosed drilling fluids may also directly or indirectly affect the various downhole equipment and tools that may come into contact with the drilling fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Accordingly, this disclosure describes compositions, methods, systems, and apparatuses that may use the disclosed drill-in fluids during drilling operations. The methods, systems, and apparatuses may include any of the following statements:

Statement 1: A method may include providing a drill-in fluid. The drill-in fluid may include an aqueous liquid, a base oil, a polyol, an emulsifying surfactant, and a solid bridging agent. The method may further include circulating the drill-in fluid through a drill-string and past a drill bit. The method may further include drilling in a reservoir section of a subterranean formation to extend a wellbore in the reservoir section the drill-in fluid is circulated therein.

Statement 2: The method of statement 1, wherein the polyol is selected from the group consisting of glycol, ethylene glycol, diethylene glycol, triethylene glycol, propylene glycol, butylene glycol, polyethylene glycol, polypropylene glycol, polyethylene-polypropylene glycol, glycerol, polyglycerol, trimethylolpropane, trimethylolethane, pentaerythritol, a sugar alcohol, a sugar acid, and combinations thereof.

Statement 3: The method of statement 1 or 2, wherein the polyol is present in the drill-in fluid in an amount of about 0.5 lb/bbl to about 15 lb/bbl.

Statement 4: The method of any one of statements 1 to 3, wherein the drill-in fluid is in the form of an invert emulsion, wherein the invert emulsion includes an internal phase and an external phase, wherein the internal phase includes the aqueous liquid, wherein the external phase includes the base oil.

Statement 5: The method of any one of statements 1 to 4, wherein the base oil includes diesel oil.

Statement 6: The method of any one of statements 1 to 5, wherein the base oil includes at least one oil selected from the group consisting of light mineral oil, diesel oil, a glycol ether solvent, a hydrotreated light petroleum distillate having about 9 to 16 carbon atoms, ethylene glycol monobutyl ether, diethylene glycol monobutyl ether, an alkane, an aromatic organic compound, a cyclic alkane, a paraffin, desulfurized hydrogenated kerosene, a polyolefin, a polydiorganosiloxane, a siloxane, an ester, the like, and combinations thereof.

Statement 7: The method of any one of statements 1 to 6, wherein the base oil is present in the drill-in fluid in an amount of about 30 wt. % to about 99 wt. % based on a total weight of the drill-in fluid.

Statement 8: The method of any one of statements 1 to 7, wherein the aqueous liquid is selected from the group consisting of brine, sea water, fresh water, and combinations thereof.

Statement 9: The method of any one of statements 1 to 8, wherein the aqueous liquid is present in the drill-in fluid in an amount of about 1 wt. % to about 70 wt. % based on a total weight of the drill-in fluid.

Statement 10: The method of any one of statements 1 to 9, wherein the solid bridging agent is selected from the group consisting of calcium carbonate, salt particulates, iron carbonate, zinc carbonate, polylactic acid, wax particulates, magnesium carbonate, magnesium oxide, manganese tetraoxide, and combinations thereof.

Statement 11: The method of any one of statements 1 to 10, wherein the solid bridging agent is present in the drill-in fluid in an amount of about 1 wt. % to about 50 wt. % based on a total weight of the drill-in fluid, and wherein the solid bridging agent has a mean particle size of about 1 micron to about 200 microns.

Statement 12: The method of any one of statements 1 to 11, wherein the drill-in fluid has a 10-second gel strength of about 3 lb/100 ft$^2$ to about 2 lb/100 ft$^2$, wherein the drill-in fluid has a 10-minute gel strength of about 3 lb/100 ft$^2$ to about 50 lb/100 ft$^2$, wherein the drill-in fluid has a yield point of 5 lb/100 ft$^2$ to about 50 lb/100 ft$^2$, and wherein the drill-in fluid has a plastic viscosity of about 10 cP to about 50 cP.

Statement 13: The method of any one of statements 1 to 12, wherein the drill-in fluid has a spurt loss of about 0.5 mL to about 20 mL.

Statement 14: The method of statement 1, wherein the drill-in fluid is in the form of an invert emulsion, wherein the invert emulsion includes an internal phase and an external phase, wherein the internal phase includes the aqueous liquid, wherein the external phase includes the base oil, wherein the base oil includes diesel oil and is present in the drill-in fluid in an amount of about 30 wt. % to about 99 wt. % based on a total weight of the drill-in fluid, wherein the aqueous liquid is present in the drill-in fluid in an amount of about 1 wt. % to about 70 wt. % based on a total weight of the drill-in fluid, wherein the polyol comprises polyethylene glycol and is present in an amount of about 0.75 lb/bbl to about 10 lb/bbl, wherein the polyol has a molecular weight of about 200 g/mol to about 1,000 g/mol, wherein the solid bridging agent comprise calcium carbonate and is present in an amount of about 1 wt. % to about 50 wt. % based on a total weight of the drill-in fluid, and wherein the drill-in fluid further includes manganese tetraoxide as a weighting agent.

Statement 15: A drill-in fluid may include a aqueous liquid; a base oil; a polyol; an emulsifying surfactant; and a solid bridging agent.

Statement 16: The drill-in fluid of statement 15, wherein the polyol is selected from the group consisting of glycol, ethylene glycol, diethylene glycol, triethylene glycol, propylene glycol, butylene glycol, polyethylene glycol, polypropylene glycol, polyethylene-polypropylene glycol, glycerol, polyglycerol, trimethylolpropane, trimethylolethane, pentaerythritol, a sugar alcohol, a sugar acid, and combinations thereof, and wherein the base oil includes at least one oil selected from the group consisting of light mineral oil, diesel oil, a glycol ether solvent, a hydrotreated light petroleum distillate having about 9 to 16 carbon atoms, ethylene glycol monobutyl ether, diethylene glycol monobutyl ether, an alkane, an aromatic organic compound, a cyclic alkane, a paraffin, desulfurized hydrogenated kerosene, a polyolefin, a polydiorganosiloxane, a siloxane, an ester, the like, and combinations thereof.

Statement 17: The drill-in fluid of statement 15 or 16, wherein the polyol is present in the drill-in fluid in an amount of about 0.5 lb/bbl to about 15 lb/bbl.

Statement 18: The drill-in fluid of any one of statements 15 to 17, wherein the drill-in fluid is in the form of an invert emulsion, wherein the invert emulsion includes an internal phase and an external phase, wherein the internal phase includes the aqueous liquid, wherein the external phase includes the base oil.

Statement 19: The drill-in fluid of any one of statements 15 to 18, wherein the base oil includes diesel oil.

Statement 20: The drill-in fluid of any one of statements 15 to 19, wherein the base oil is present in the drill-in fluid in an amount of about 30 wt. % to about 99 wt. % based on a total weight of the drill-in fluid, and wherein the aqueous liquid is present in the drill-in fluid in an amount of about 1 wt. % to about 70 wt. % based on a total weight of the drill-in fluid.

To facilitate a better understanding of the present technique, the following examples of some specific embodiments are given. In no way should the following examples be read to limit, or to define, the scope of the invention.

Example 1

Two drill-in fluids were prepared, tested, and then compared to determine the effect a polyol had on a drill-in fluid composition. Drill-In Fluid A was a comparative fluid that did not include the polyol. Drill-In Fluid B includes Polyethylene glycol. First, the drill-in fluids were prepared and then hot rolled at 132° C. (270° F.) for about 16 hours, the compositions are shown in Table 1.

TABLE 1

| Drill-in Fluid Components | Drill-In Fluid A (Comparative) | Drill-In Fluid B |
|---|---|---|
| Base Oil (bbl) | 0.499 | 0.499 |
| Polyaminated fatty acid (lb) | 14 | 14 |
| Lime (lb) | 2.5 | 2.5 |
| Modified fatty acid (lb) | 0.4 | 0.4 |
| Crosslinked polymer (lb) | 6.5 | 6.5 |
| Tap Water (lb) | 47.25 | 47.25 |
| Salt in powder form (lb) | 13.75 | 13.75 |
| Amorphous/fibrous material (lb) | 0.6 | 0.6 |
| Hausmannite Ore (lb) | 338.586 | 338.586 |
| Oil Wetting Agent (lb) | 0.50 | 0.50 |
| Polyol (lb) | — | 3 |
| Ground Marble w/an average particle size of about 25 (lb) | 10 | 10 |
| Ground Marble w/an average particle size of about 50 (lb) | 25 | 25 |
| Ground Marble w/an average particle size of about 150 (lb) | 15 | 15 |
| Natural Cellulose Fiber (lb) | 2 | 2 |
| Resilient Graphitic Carbon Material (lb) | 2 | 2 |

Rheology data was obtained for each drill-in fluid before hot rolling (BHR) and after hot rolling (AHR) according to API Recommended Practice 13B-2, Recommended Practice for Field Testing of Oil-based Drilling Fluids, Fifth Edition, American Petroleum Institute, August 2014, using a FAN N® Model 35A direct reading rotational viscometer at 65° C. (150° F.) by measuring the shear stress of the bob at shear rates between 3 rpm to 600 rpm (units: lb/100 ft2). The results are shown in Table 2.

TABLE 2

| | Drill-in Fluid A | | Drill-in Fluid B | |
|---|---|---|---|---|
| RPM | BHR | AHR | BHR | AHR |
| 600 | 91 | 88 | 94 | 92 |
| 300 | 58 | 54 | 60 | 57 |
| 200 | 44 | 41 | 48 | 46 |
| 100 | 30 | 28 | 34 | 31 |
| 6 | 10 | 9 | 13 | 10 |
| 3 | 8 | 7 | 11 | 9 |

The Rheology data was then used to determine the plastic viscosity (PV, cP) and the Yield Point (YP, lb/100 ft$^2$). The Plastic Viscosity was calculated by subtracting the shear stress at 300 RPM from the shear stress at 600 RPM. The Yield Point was determined by subtracting the Plastic Viscosity from the shear stress at 300 RMP. These values were determined for each drill-in fluid before hot rolling and after hot rolling. The 10-second gel strength and the 10-minute gel strength were also determined. The Electrical Stability at 65° C. (150° F.) was also determined. A high-temperature high-pressure (HTHP) filtration test was also performed at 132° C. (270° F.). Filtration was measured with a saturated API HTHP fluid loss cell. The results are shown in Table 3.

TABLE 3

| | Drill-in Fluid A | | Drill-in Fluid B | |
|---|---|---|---|---|
| | BHR | AHR | BHR | AHR |
| Plastic Viscosity (cP) | 33 | 34 | 34 | 35 |
| Yield Point (lb/100 ft$^2$) | 25 | 20 | 26 | 22 |

TABLE 3-continued

|  | Drill-in Fluid A | | Drill-in Fluid B | |
| --- | --- | --- | --- | --- |
|  | BHR | AHR | BHR | AHR |
| 10-Second Gel Strength (lb/100 ft$^2$) | 9 | 9 | 10 | 9 |
| 10-Minute Gel Strength (lb/100 ft$^2$) | 12 | 13 | 13 | 12 |
| Electrical Stability | 490 | 430 | 410 | 376 |
| HTHP Filtrate (mL) | — | 1.2 | — | 0.6 |

The drill-in fluids were also tested to determine certain fluid loss properties, including the spurt loss (mL) and the total amount of filtrate (mL). These tests were conducted using a FANN Permeability Plugging Apparatus according to API Recommended Practice 13B-2, Recommended Practice for Field Testing of Oil-based Drilling Fluids, Fifth Edition, American Petroleum Institute, August 2014. The tests were run at conditions of about 150° C. (300° F.) and a pressure differential of about 3,000 psi (21 bar). The tests were run using a disk with the size of 55 microns and 120 microns. The results for the drill-in fluids after hot rolling are shown in Table 4.

TABLE 4

|  | Drill-in Fluid A | | Drill-in Fluid B | |
| --- | --- | --- | --- | --- |
|  | Spurt Loss (mL) | Total Filtrate (mL) | Spurt Loss (mL) | Total Filtrate (mL) |
| Disk size 55μ | 7 | 11 | 3 | 7 |
| Disk size 120μ | 9 | 17 | 3 | 9 |

Based on the results above, one may conclude that by including a polyol to a drill-in fluid may minimize the fluid loss by about ½ when compared to drill-in fluids that do not include a polyol.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

Therefore, the present embodiments are well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method comprising:
providing a drill-in fluid, wherein the drill-in fluid comprises:
an aqueous liquid;
a base oil;
a polyol, wherein the polyol comprises polyethylene glycol and is present in an amount of about 0.5 lb/bbl to about 3 lb/bbl, wherein the polyol has a molecular weight of about 200 g/mol to about 1,000 g/mol;
an emulsifying surfactant, wherein the emulsifying surfactant is present in the drill-in fluid in an amount of about 2 lb/bbl to about 24 lb/bbl;
a solid bridging agent in an amount of about 20 to about 50 wt. % based on a total weight of the drill-in fluid and wherein the solid bridging agent has a mean particle size of about 1 micron to about 200 microns;
a weighting agent comprising at least one material selected from the group consisting of barite, calcium carbonate, and manganese tetraoxide in an amount ranging from about 10 lb/bbl (29 kg/m$^3$) to about 600 lb/bbl (1710 kg/m$^3$); and
a filtration control agent selected from the group consisting of a cellulose derivative, a latex polymer, a copolymer of acrylamido-2-methyl-2-propanesulfonic acid, polyanionic cellulose, polyacrylate, modified lignite, modified starch; carboxymethylcellulose, starch, starch ether derivatives, hydroxyethylcellulose, cross-linked hydroxyethylcellulose, methylestyrene-coacrylate, a substituted styrene copolymer, any derivative thereof, and any combination thereof, present in an amount of about 0.5 lb/bbl to about 15 lb/bbl;
circulating the drill-in fluid through a drill-string and past a drill bit; and
drilling in a reservoir section of a subterranean formation to extend a wellbore in the reservoir section the drill-in fluid is circulated therein.

2. The method of claim 1, wherein the polyol further comprises at least another polyol selected from the group consisting of glycol, diethylene glycol, triethylene glycol, propylene glycol, butylene glycol, polypropylene glycol, polyethylene-polypropylene glycol, glycerol, polyglycerol, trimethylolpropane, trimethylolethane, pentaerythritol, a sugar alcohol, a sugar acid, and combinations thereof.

3. The method of claim 1, wherein the polyol is present in the drill-in fluid in an amount of about 1 lb/bbl to about 3 lb/bbl.

4. The method of claim 1, wherein the drill-in fluid is in the form of an invert emulsion, wherein the invert emulsion comprises an internal phase and an external phase, wherein the internal phase comprises the aqueous liquid, wherein the external phase comprises the base oil.

5. The method of claim 4, wherein the base oil comprises diesel oil.

6. The method of claim 1, wherein the base oil comprises at least one oil selected from the group consisting of mineral oil, diesel oil, a glycol ether solvent, a hydrotreated petroleum distillate having about 9 to 16 carbon atoms, ethylene glycol monobutyl ether, diethylene glycol monobutyl ether, an alkane, an aromatic organic compound, a cyclic alkane, a paraffin, desulfurized hydrogenated kerosene, a polyolefin, a polydiorganosiloxane, a siloxane, an ester, and combinations thereof.

7. The method of claim 1, wherein the base oil is present in the drill-in fluid in an amount of about 30 wt. % to about 99 wt. % based on a total weight of the drill-in fluid.

8. The method of claim 1, wherein the aqueous liquid is selected from the group consisting of brine, sea water, fresh water, and combinations thereof.

9. The method of claim 1, wherein the aqueous liquid is present in the drill-in fluid in an amount of about 1 wt. % to about 70 wt. % based on a total weight of the drill-in fluid.

10. The method of claim 1, wherein the solid bridging agent is selected from the group consisting of calcium carbonate, salt particulates, iron carbonate, zinc carbonate, polylactic acid, wax particulates, magnesium carbonate, magnesium oxide, manganese and combinations thereof.

11. The method of claim 1, wherein the drill-in fluid has a 10-second gel strength of about 3 lb/100 ft$^2$ to about 25 lb/100 ft$^2$, wherein the drill-in fluid has a 10-minute gel strength of about 3 lb/100 ft$^2$ to about 50 lb/100 ft$^2$, wherein the drill-in fluid has a yield point of 5 lb/100 ft$^2$ to about 50 lb/100 ft$^2$, and wherein the drill-in fluid has a plastic viscosity of about 10 cP to about 50 cP.

12. The method of claim 1, wherein the drill-in fluid has a spurt loss of about 0.5 mL to about 20 mL.

13. The method of claim 1, wherein the drill-in fluid is in the form of an invert emulsion, wherein the invert emulsion comprises an internal phase and an external phase, wherein the internal phase comprises the aqueous liquid, wherein the external phase comprises the base oil, wherein the base oil comprises diesel oil and is present in the drill-in fluid in an amount of about 30 wt. % to about 99 wt. % based on a total weight of the drill-in fluid, wherein the aqueous liquid is present in the drill-in fluid in an amount of about 1 wt. % to about 70 wt. % based on a total weight of the drill-in fluid, wherein the solid bridging agent comprises calcium carbonate, and wherein the drill-in fluid further comprises manganese tetroxide as the weighting agent.

14. A method comprising:
circulating an invert emulsion drill-in fluid into a well bore while drilling through a reservoir section of a subterranean formation, wherein the invert emulsion drill-in fluid comprises:
an aqueous internal phase comprising saltwater;
a diesel base oil;
a polyol, wherein the polyol comprises polyethylene glycol and is present in an amount of about 0.5 lb/bbl to about 3 lb/bbl, wherein the polyol has a molecular weight of about 200 g/mol to about 1,000 g/mol;
an emulsifying surfactant, wherein the emulsifying surfactant is present in the drill-in fluid in an amount of about 2 lb/bbl to about 24 lb/bbl;
a solid bridging agent in an amount of about 20 to about 50 wt. % based on a total weight of the drill-in fluid and wherein the solid bridging agent has a mean particle size of about 1 micron to about 200 microns;
a weighting agent comprising at least one material selected from the group consisting of barite, calcium carbonate, and manganese tetraoxide in an amount ranging from about 10 lb/bbl (29 kg/m$^3$) to about 600 lb/bbl (1710 kg/m$^3$); and
a filtration control agent selected from the group consisting of a cellulose derivative, a latex polymer, a copolymer of acrylamido-2-methyl-2-propanesulfonic acid, polyanionic cellulose, polyacrylate, modified lignite, modified starch; carboxymethylcellulose, starch, starch ether derivatives, hydroxyethylcellulose, cross-linked hydroxyethylcellulose, methylestyrene-coacrylate, a substituted styrene copolymer, any derivative thereof, and any combination thereof, present in an amount of about 0.5 lb/bbl to about 15 lb/bbl.

15. The method of claim 14, wherein the solid bridging agent comprises calcium carbonate.

16. The method of claim 14, wherein the weighting agent comprises the manganese tetroxide.

17. The method of claim 14, wherein the polyol further comprises at least another polyol selected from the group consisting of glycol, diethylene glycol, triethylene glycol, propylene glycol, butylene glycol, polypropylene glycol, polyethylene-polypropylene glycol, glycerol, polyglycerol, trimethylolpropane, trimethylolethane, pentaerythritol, a sugar alcohol, a sugar acid, and combinations thereof.

18. The method of claim 14, wherein the invert emulsion drill-in fluid has a 10-second gel strength of about 5 lb/100 ft$^2$ to about 20 lb/100 ft$^2$, wherein the invert emulsion drill-in fluid has a 10-minute gel strength of about 3 lb/100 ft$^2$ to about 35 lb/100 ft$^2$, wherein the invert emulsion drill-in fluid has a yield point of 5 lb/100 ft$^2$ to about 35 lb/100 ft$^2$, wherein the invert emulsion drill-in fluid has a plastic viscosity of about 10 cP to about 50 cP.

19. The method of claim 14, wherein the invert emulsion drill-in fluid has a spurt loss of about 0.5 mL to about 20 mL.

* * * * *